No. 696,927. Patented Apr. 8, 1902.
E. BAUMANN.
LOCKING DEVICE FOR SWINGING HANDLES.
(Application filed Nov. 2, 1901.)
(No Model.)

Witnesses:
N. Jacobs
F. C. Fliedner

Inventor:
Erhard Baumann.
By his Attorney,
F. A. Richards.

THE NORRIS PETERS CO., PHOTO-LITHO., WASHINGTON, D. C.

UNITED STATES PATENT OFFICE.

ERHARD BAUMANN, OF AMBERG, GERMANY.

LOCKING DEVICE FOR SWINGING HANDLES.

SPECIFICATION forming part of Letters Patent No. 696,927, dated April 8, 1902.

Application filed November 2, 1901. Serial No. 80,864. (No model.)

*To all whom it may concern:*

Be it known that I, ERHARD BAUMANN, a subject of the Emperor of Germany, residing in Amberg, Bavaria, Germany, have invented certain new and useful Improvements in Locking Devices for Swinging Handles, of which the following is a specification.

This invention relates to locking devices for swinging handles, and has for its object to provide an inexpensive and efficient device for locking in an upright position the swinging handles or bails of various vessels.

A further object of the invention is to provide improved automatic means for locking swinging handles in an upright position.

Another object of the invention is to provide improved locking means which will automatically lock the handle when it assumes an upright position and will securely hold the same in such position during the operation of pouring; and another object of the invention is to provide improved means for maintaining the bail of a vessel out of contact with the body thereof when the bail is turned down.

In applying my invention to vessels of various descriptions having bails or swinging handles attached to the vessels by means of ears, one of the ears or the bail may have a bifurcated end projecting therefrom and effective when the bail is raised to embrace the other member upon each side and hold the bail in an upright or other predetermined position. The bail may be provided with a bend having somewhat the analogy of a cam-face effective to ride over the face of the ear, which may be made curved or rounding to permit such face to ride easily over the ear and direct such cam-face toward the slot forming the bifurcation, and the pivotal connection of the bail with the body may be such that the bail will not only have a swinging movement relatively to the body, but also a longitudinal movement, which latter movement permits the bail to be more firmly held in the desired position, and especially during the operation of pouring from the vessel if the parts are so assembled that the device will be operative during such pouring position. Such longitudinal movement also permits the device to become operative when the handle is left in a raised position by a cam-face action of a slot on a portion of the handle, causing such movement and consequent locking.

Figure 1:
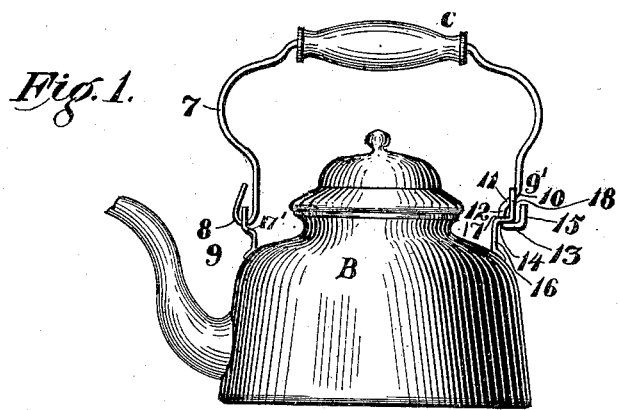
Figure 2:
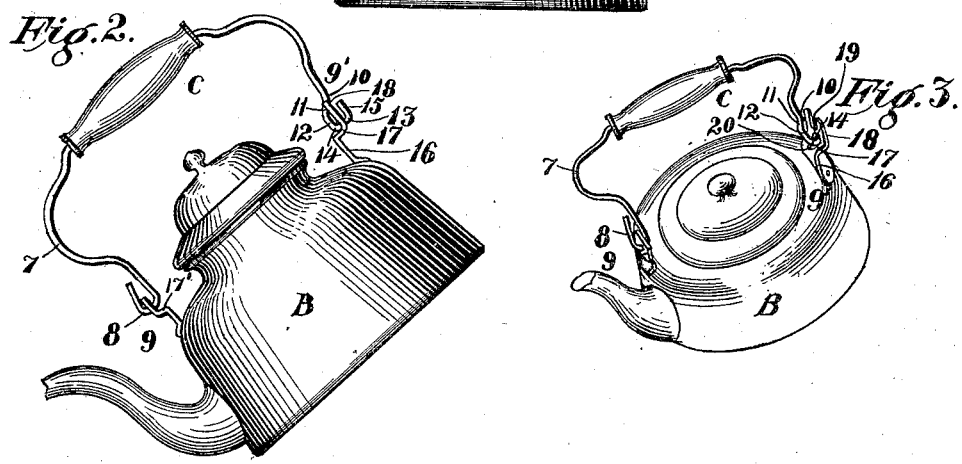
Figure 3:
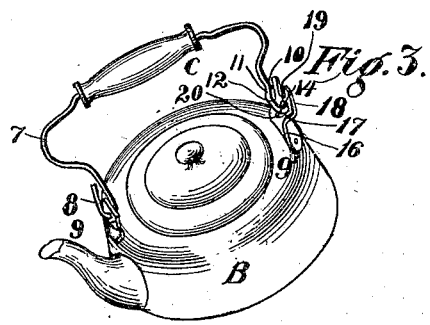
Figure 4:
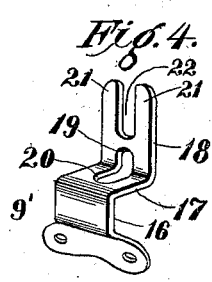
Figure 5:
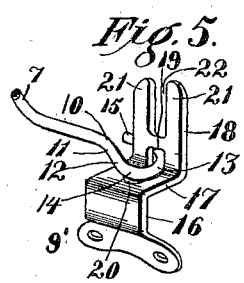
Figure 6:
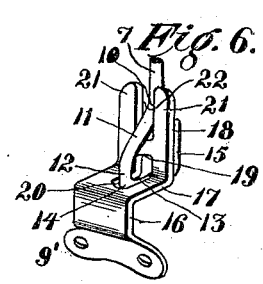

In the drawings accompanying and forming a part of this specification, Figure 1 is a side view showing one form of my invention as applied to a tea-kettle. Fig. 2 is a similar view showing the vessel in the position of pouring therefrom. Fig. 3 is a perspective view looking at the same from above and to one side. Fig. 4 is a perspective view of a form of ear. Figs. 5 and 6 are perspective details showing the bail and ear in two different positions relative to each other.

Similar characters of reference designate corresponding parts in the various figures.

The invention is shown as applied to a vessel, (designated in a general way by B,) which vessel is provided with a bail (designated in a general way by C) and which in the present instance embodies the bail portion 7, having at one end a loop 8, pivoted to the vessel by an ear 9, on which it is free to turn and which connection may be made to permit a certain amount of longitudinal movement of the bail. The other end of the bail is shown as having an outwardly-bent portion 10, an inwardly-bent portion 11, a downwardly-extending portion 12, and outwardly-projecting portion 13 connected to said downwardly-projecting portion 12 by a rounding portion 14, and an upwardly-projecting portion 15. The ear 9', by which this last-mentioned end of the bail is pivoted to the body of the vessel, is shown in the present instance as comprising an upwardly-projecting portion 16, an outwardly-projecting or transverse portion 17, and an upwardly-projecting portion 18. The pivotal portion of this end of the bail or the transverse portion 13 is shown as being seated in a hole 19 in the portion 18, which hole is connected with a slot 20 in the portion 17. The upper part 18 of the ear is bifurcated, having two side portions 21 21 and a kerf or notch 22. The edges of the upper portion 18 of the ear are effective upon the raising of the bail to engage the portion 10 of the handle, which is somewhat analogous in construction to a cam-face, and to press or spring that end of the handle inward, and upon such cam-face passing into the region of the kerf the elasticity or spring of the handle will direct the same thereinto, in which position it will remain until removed. To further seat the bail within the kerf, the weight of the handle causes the portion 14 to slide upon the edge of the slot 20 and to press the bail still further between the side members of such bifurcated ear, such movement being assisted by the longitudinal play afforded at the other ear.

When the invention is applied to a vessel having a spout in substantial alinement with the pivots of the bail and the vessel is tipped by such bail in the operation of pouring the contents from the vessel, the weight of the vessel will hold the bail securely in the kerf and prevent all oscillation of the vessel upon the bail. Consequently it will be impossible in the operation of pouring from a vessel provided with my invention for the vessel to turn and come in contact with the hand of the operator or to misdirect the stream from the spout.

For maintaining the bail away from the side of the vessel when the bail is turned down the ears may be provided with ledges, which in the present instance are shown as transverse portions 17 17' of such ears. Upon the turning down of the bail such ledges afford a support therefor and hold it away from the side of the vessel, both for the purpose of keeping it cool and to prevent the injurious contact between bail and body.

Although the drawings show the invention applied to a tea-kettle, yet it is applicable to many other analogous articles, as will be apparent.

Having described my invention, I claim—

1. A fastening for the handles of culinary and other vessels, comprising ears of which one is bent substantially at right angles to form a horizontal portion and a vertical portion, said portions having communicating slots or openings at the bend, and said vertical portion having a notch therein; and a pivoted bail having one of its ends working or turning in said slots, and also formed with a cam-like spring-bend moving over the surface of the vertical portion of the ear and slipping into the notch on turning the bail uprightly, said cam-like bend being engaged by the sides of said notch and preventing oscillation of the vessel when lifted or carried by the bail.

2. A fastening for the handles of culinary and other vessels, comprising ears of which one is bent substantially at right angles to form a horizontal portion and a vertical portion, said portions having communicating slots or openings at the bend, and said vertical portion having a notch therein; and a pivoted bail capable of limited horizontal movement between the ears, and having one end thereof working or turning in said slots, and also formed with a cam-like spring-bend moving over the surface of said vertical portion of the ear and slipping into the notch on turning the bail uprightly, said cam-like bend being engaged by the sides of said notch when the vessel is lifted or carried by the bail, and said horizontal portion of the ear constituting a rest for the bail when turned downwardly to one side.

3. In fastenings for the handles of culinary or similar vessels, a bail-ear having a notch and a pivot-seat for the end of the bail, and formed with a transverse portion having a slot communicating with such seat; and a bail bent near one end to form a pivot working in said pivot-seat, and having a spring-like portion engaged by the sides of the notch when the bail is turned uprightly.

ERHARD BAUMANN.

Witnesses:
ROBERT HARTMANN,
AUGUST BARTH.